May 22, 1951

M. FRENKEL 2,553,536

ANGULAR CONTACT BEARINGS AND TAPER ROLLER BEARINGS

Filed March 3, 1947

INVENTOR

Meyer Frenkel

Patented May 22, 1951

2,553,536

UNITED STATES PATENT OFFICE 2,553,536

ANGULAR CONTACT BEARING AND TAPER ROLLER BEARING

Meyer Frenkel, London, England

Application March 3, 1947, Serial No. 732,027
In Great Britain March 4, 1946

6 Claims. (Cl. 308—183)

The present invention relates to double-row rolling bearings, and is particularly concerned with double-row ball bearings and double-row taper roller bearings.

The objects of the present invention will be understood from the following considerations:

It is known that a radial load on a rolling bearing will cause a small approach of the bearing rings in the line of action of the radial load, due to elastic deformation. For a radial load W acting on a single-row rolling bearing, this imposes on the rolling body in the line of action of the radial load at the position of maximum approach of the rings a load of approximately $$w_{max} = 4.36 \cdot \frac{W}{Z}$$

Z being the number of rolling bodies in the race—while the rolling body in the diametrically opposite position in the race will not be subjected to any load due to the radial loading.

Thus, the radial load on the bearing is only carried by less than half of the rolling bodies in the bearing—e. g. for a bearing with Z=10 one rolling body at any time carrying almost half the radial load—and altogether there will be a difference in the radial components of the pressure forces acting on the most heavily and the least loaded balls in the race of $$w_{max} - w_{min} = 4.36 \cdot \frac{W}{Z}$$

In angular contact bearings, this will produce a difference between the axial components $t_{max}$ and $t_{min}$ respectively of the resultant pressure forces on the most and least loaded ball in the race of $$t_{max} - t_{min} = 4.36 \cdot \frac{W}{Z} \cdot \tan \alpha$$

where $\alpha$ is the mean angle of contact of the bearing.

Similarly, in an orthodox double-row bearing carrying a radial load W presumed equally distributed over both races, the radial load $$\frac{W}{2}$$

and the resulting axial reaction $$\frac{W}{2} \cdot \tan \alpha$$

are in each race carried by considerably less than half the number of rolling bodies—the difference in the radial components of the pressure-forces on the most and least loaded rolling bodies being $$w_{2\,max} - w_{2\,min} = 2.18 \frac{W}{Z}$$

and the difference in the axial components of the said pressure-forces $$t_{2\,max} - t_{2\,min} = 2.18 \cdot \frac{W}{Z} \cdot \tan \alpha$$

This means that the greater part of the rolling bodies is not loaded at all, unless the bearing carries also an axial load. Due to the action of this axial load, however, only the rolling bodies in one race can be loaded, while those in the other race will be unloaded.

A bearing is generally constructed for a certain loading of its rolling bodies, say a certain combination of axial and radial load. Accordingly, if a bearing is constructed to suit the loading on the most heavily loaded rolling body, it will not be suitable for the least loaded rolling body in it, and vice versa, due to the large differences shown above, which causes trouble in present types of rolling bearings leading to rapid wear. These differences become manifest, because the relations of the dimensions, being a function of the axial component of the resultant pressure on a ball, for example, will fit a ball in one position in the bearing, but not necessarily in another position, and therefore trouble may result.

In bearings constructed in accordance with the "relations of dimensions," published in my paper "Ball and taper rolling bearings" in the Journal of the Royal Aeronautical Society, London, England, No. 423, volume 50, the troubles such as excessive sliding, oscillations of the rolling bodies, skewing, periodic impact against tracks and cage, and the like, imposing the present limits on the speed of operation and life of bearings, are eliminated.

Accordingly, it is an object of this invention to provide constructions of double-row rolling bearings in which all, or nearly all, rolling bodies take part in the carrying of a radial load on the bearing. It is a further object of this invention to provide double-row rolling bearings, in which the axial components of the pressure-forces between rolling bodies and their tracks only differ by negligibly small amounts for a rolling body in any circumferential position in the same row.

In order to achieve these objects, this invention provides for constructions of double row bearings, in which the positions, in which a rolling body becomes subject to maximum loading due to an external radial load, are diagonally opposite in the two rows—instead of being adjacent, as in present double-row bearings—and in which one bearing ring is mounted so as to be capable of angular displacement in any plane containing the bearings axis.

The invention now will be described by way of example and in detail, with reference to the accompanying drawings, in which—

Figure 1:
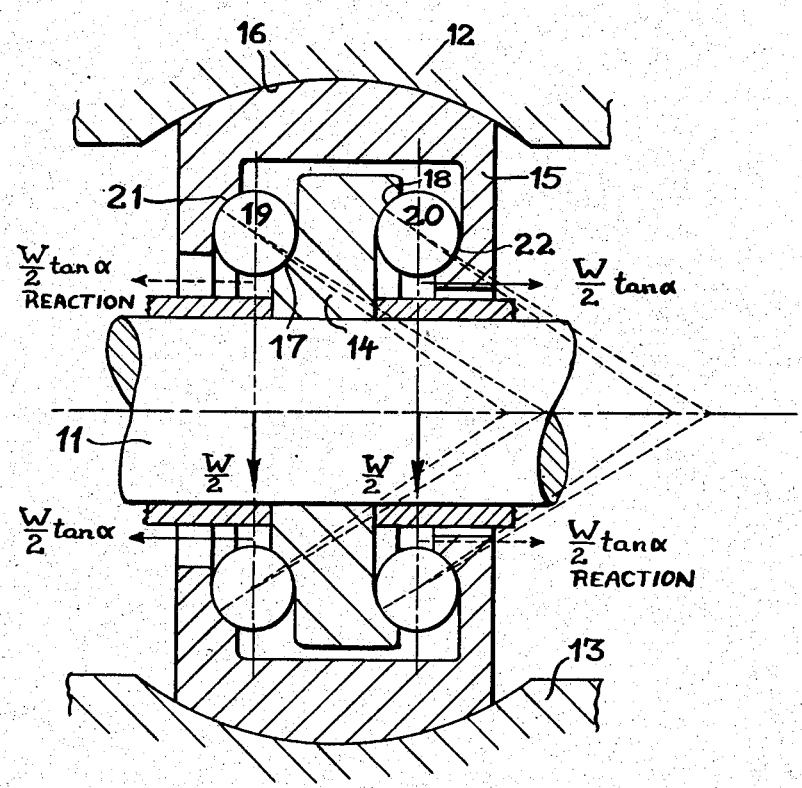
Fig. 1 shows in diagrammatic manner a section through a double-row angular contact ball bearing made according to this invention.

As shown in Fig. 1, the rotating shaft 11 carries a bearing ring 14, the nonrotating bearing ring 15 being secured on a spherical seating 16 on the mountings 12 and 13, thus being capable of angular displacement in any plane containing the axis of the assembled bearing. The rotating (driving) bearing ring 14 is formed with oppositely facing track-grooves 17 and 18, the groove 17 forming the inner (adjacent to bearing axis) track for one row of balls 19 and the groove 18 forming the outer track for the second row of balls 20. The nonrotating bearing ring 15 is formed with oppositely facing track-grooves 21 and 22, groove 21 serving as the outer track for the row of balls 19 and groove 22 serving as the inner track for the second row of balls 20.

The axes of symmetry of the contours of the track-grooves in planes containing the bearing axis are parallel for both inner and both outer tracks, and between the inner and outer tracks respectively differ only by a small angle $\vartheta$.

Figure 2:
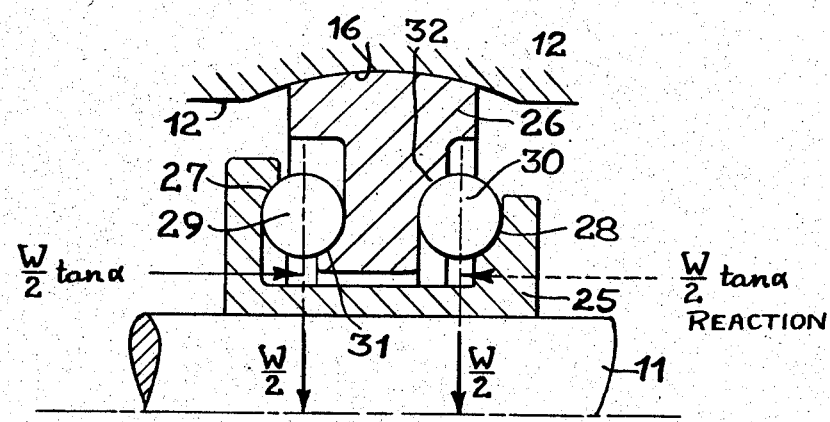
Fig. 2 shows in diagrammatic manner a half-section through another example of an angular contact ball bearing made according to this invention.

In the example shown in Fig. 2, the bearing rings are reversed, the ring 25, U-shaped in cross-section, being keyed to the shaft 11 and forming the driving ring, and the ring 26 being mounted on the spherical seating 16 and forming the non-rotating ring capable of angular displacement in any plane containing the bearing axis. The grooves 27 and 28 on the rotating ring 25 serve respectively as the outer and the inner tracks of the first row of balls 29 and of the second row of balls 30, whereas the grooves 31 and 32 of the nonrotating ring 26 serve as the inner and outer tracks of the two rows of balls respectively.

In both examples, the balls in the two rows are shown to be exactly opposite one another—that is, four balls are shown in the plane of the drawing—which may be achieved by suitable cage means, having the spaces for corresponding balls in the two rows exactly opposite one another.

With reference to the above described examples for double-row angular contact ball bearings, it will be seen that this invention provides, in contrast to the usual double-row rolling bearings with one ring forming both the inner and the other ring forming both the outer tracks for the two rows of balls, a structure wherein each bearing ring has on one side the inner track for one row of balls, and on its other side the outer track for the other row of balls, with one of said bearing rings being mounted so as to be capable of angular displacement in any plane containing the bearing axis. Furthermore, the rolling tracks in the bearing rings are each in contour at least in part symmetrically shaped about axes of symmetry, which intersect the bearing axis, and respectively form cones about this axis whose apices all open in the same direction along the bearing axis. This last condition is observed in the examples already described by making the axes of symmetry of the groove-contours in each plane containing the bearing axis parallel for both inner tracks, and similarly parallel for both outer tracks, and making them differ in direction between an inner and an outer track only by the small angle $\vartheta$. The resultant pressure forces exerted on each of the rings by two balls in corresponding position in the two rows will therefore act substantially in opposite directions or, in other words, considering one ring, the pressure-force from one such ball will be rotated by an angle of $(180°-\vartheta)$ relatively to the pressure-force exerted on the other track of the same ring by the ball in the corresponding position in the second row.

The operation of structures made according to this invention will be understood from the explanations made below with reference to Fig. 1:

When the shaft 11 carries a radial load W acting downwards, each of the two sets of balls will carry half this load, namely, $$\frac{W}{2}$$

Due to the construction shown, the left hand row of balls will carry this load $$\frac{W}{2}$$

distributed over some balls in the lower half of the row—the most heavily loaded ball being the bottom one—and the right hand row of balls will carry this radial load distributed over some balls in the upper half of the row, the most heavily loaded ball being the top one. Consequently, resultant axial forces of magnitude $$\frac{W}{2} \cdot \tan \alpha_1 - \alpha$$

being the mean angle of contact of the respective ball races—arise in the load-carrying bottom left and top right parts of the two rows of balls 19 and 20, acting respectively outwards on the outer ring of the bearing, thus forming a couple tending to rotate this ring in the plane of the drawing in the clockwise direction. However, since this ring is mounted on its spherical seating 16 and thus is capable of angular displacement in this plane, this couple of the axial forces calls forth an equal opposing couple of axial reactions in those halves of the rows of balls, which are not directly loaded due to the radial load, i. e., in the top left hand and bottom right hand parts of the rows of balls 19 and 20; or, in other words, this couple causes resultant axial reactions of magnitude $$\frac{W}{2} \cdot \tan \alpha$$

on those balls in the respective rows of balls, which have no direct part in carrying the radial load. Since a resultant force of $$\frac{W}{2} \cdot \tan \alpha$$

is already exerted by the directly radially loaded half of the balls in each row, all the balls in each row will thus be subject to a total axial pressure of magnitude $W.\tan a$, whose resultant vector passes through the center of the respective row.

Therefore, because the resultant of the axial pressure forces on each row of balls passes through the center of such row, the differences in the axial pressure-forces on balls in different position round the periphery of the bearing are made negligibly small.

This, however, will be seen to apply only to structures of angular contact bearings in which the bearing is subject to such loading, that $W.\tan a > T$, the external axial load on the bearing, for if this latter condition were not observed, the ball race not carrying the outside axial load would again be unloaded, and the greater part of its balls would not be subject to load due to the radial load. This latter condition can be varied, however, by suitable pre-loading of the assembled bearing.

Accordingly, in structures according to this invention, all balls in any position round the circumference of respectively each row will be subject to equal axial forces, which cause their cup-shaped elastic impressions all round the circumference of each track. Now, with the exception of such cup-shaped impressed contact areas which may instantaneously be situated in the plane containing the bearing axis and normal to the resultant radial load, each such cap-shaped impression made by a ball on the non-driving track will with one of its sides support this ball against the action of the external radial load; or, in other words, each such impression will exert a component force acting against a displacement of the ball in the direction of the external radial load on the bearing. In its turn, each ball, with the exception of those instantaneously situated in the plane through the bearing axis and normal to the resultant radial load, will, through the corresponding cup-shaped impressions on the driving track, exert a component force on the driving ring against the external radial load, which tends to displace this ring in its own line of action.

Therefore, in contrast to orthodox bearings, in which only less than half the balls in a race take part in the carrying of the radial load, in a bearing according to this invention the number of balls taking part in the carrying of the radial load varies between Z, the total number of balls in each race, and $(Z-2)$ balls, that is, at the instant when there is no ball in the plane containing the bearing axis and normal to the external radial load vector, all balls in each row take part in the carrying of the radial load, the total being Z per row. At the instant when there is only one ball in such plane, as will be the case in certain constructions, $(Z-1)$ balls in each row take part in the carrying of the radial load on the bearings; and at the instant when two balls per row are situated in said plane, as would occur in the examples shown, the minimum number of $(Z-2)$ balls per row take part in the carrying of the radial load on the bearing.

In this way, in structures according to this invention, substantially all, or nearly all balls in a double-row angular contact ball bearing take part in the carrying of a radial load on the bearing, and all balls in both rows are subject to axial components of the pressure-forces on each ball, which are equal in each row for all peripheral positions of a ball in the bearing. Therefore, precise "relations of the dimensions," according to which the bearing may be constructed, apply to every ball in every position in the bearing.

As already stated, this applies only for loading conditions in which the external radial load W is such that $W.\tan a > T$, the external axial load—in which case then one row of balls is subject to total axial force $(W.\tan a + T)$ and the other row is subject to total axial force $(W.\tan a - T)$—although other proportions of external radial to external axial loading may be carried if the bearing is suitably pre-loaded.

In order to equalize the loading conditions on rollers in different peripheral positions in a taper roller bearing, this invention provides corresponding constructions of double-row taper roller bearings, in which under radial load the positions of maximum loading on a roller are diagonally opposite in the two rows of rollers—instead of being adjacent as in present constructions—and in which one bearing ring is mounted so as to be capable of angular displacement in any plane containing the bearing axis.

Figure 3:
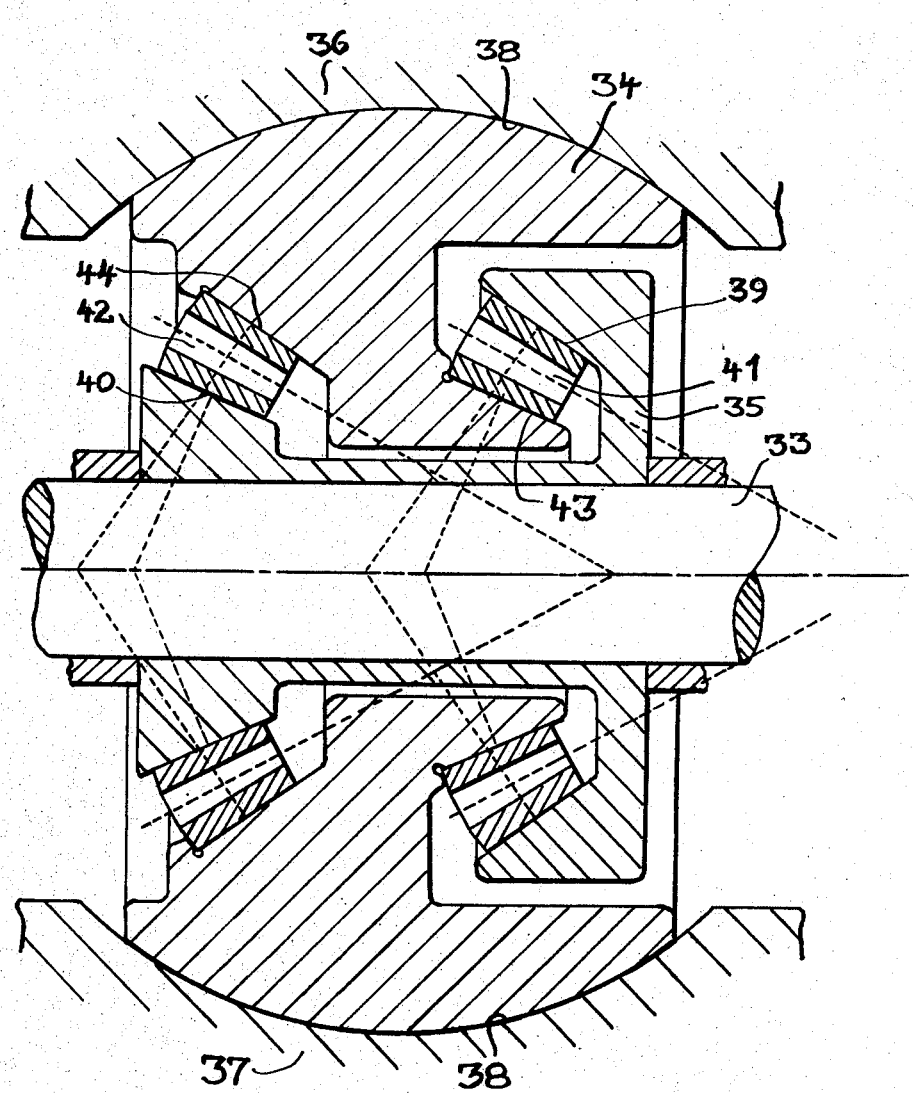
Fig. 3 shows in diagrammatic manner a double-row taper roller bearing made in accordance with the invention.

As shown in Fig. 3, the shaft 33 runs between fixed members 36 and 37 each formed with a spherical seating 38 to support the outer bearing ring 34 with its center on the bearing axis. The inner bearing ring 35 is keyed to the shaft 33.

The bearing ring 34 is formed with oppositely facing races 39 and 40, race 39 serving as the outer race for the one row of rollers 41 and race 40 serving as the inner race for the second row of rollers 42. The bearing ring 35 is also formed with oppositely facing tracks, the one 43 serving as the inner track for the first row of rollers 41 and the other 44 serving as the outer track for the second row of rollers 42.

The tracks have each at least in part symmetrically shaped contours, the axes of symmetry of said contours intersecting the bearing axis and respectively forming cones about said axis, whose apices all open in the same direction. As an example of this condition, Fig. 3 shows the geometric axes of rollers in corresponding positions in the two rows to be parallelly directed.

Bearings according to this invention may be provided with suitable means preventing rotation about the bearing axis relatively to its mounting of the bearing ring which is capable of angular displacement in any plane containing the bearing axis.

It will be understood that the foregoing description of embodiments of the invention is by way of example only, and that many modifications, omissions and additions are possible without departing from the spirit of the invention.

I claim:

1. A rolling bearing comprising two bearing rings and two sets of rolling bodies interposed between said bearing rings and rotating about a common bearing axis, one bearing ring having on one side a track remote from the bearing axis for one set of rolling bodies and on its other side a track adjacent said bearing axis for the second set of rolling bodies, and the second bearing ring having on one side a track adjacent the bearing axis for said first-mentioned set of rolling bodies and on its other side a track remote from the bearing axis for said second set of rolling bodies, and a mounting for one of said bearing rings permitting angular displacement of said ring in any plane containing the bearing axis.

2. Rolling bearings as claimed in claim 1, wherein said mounting forms a spherical seat for securing the nonrotating bearing ring to the bearing housing for the purpose of permitting angular displacement of said ring in any plane containing the bearing axis.

3. A rolling bearing as claimed in claim 1, comprising means for preventing rotation of one of said bearing rings about the bearing axis relatively to its mounting while permitting angular displacement of the said ring in any plane containing the bearing axis.

4. A rolling bearing comprising two bearing rings and two sets of rolling bodies interposed between said bearing rings and rotating about a common bearing axis, one bearing ring having on one side a track remote from the bearing axis for one set of rolling bodies and on its other side a track adjacent said bearing axis for the second set of rolling bodies, and the second bearing ring having on one side a track adjacent said bearing axis for said first-mentioned set of rolling bodies and on its other side a track remote from the bearing axis for said second set of rolling bodies, the contours of the rolling tracks in the said bearing rings, in planes containing the bearing axis, being each at least in part symmetrically shaped about an axis of symmetry, which axes of symmetry for each track respectively intersect on the bearing axis and form about said bearing axis cones whose apices all open in the same direction along said bearing axis, and a mounting for one of said bearing rings permitting angular displacement of said ring in any plane containing the bearing axis.

5. A rolling bearing comprising two bearing rings each having two grooved tracks and two sets of balls interposed between said grooved tracks and rotating about a common bearing axis, one bearing ring having on one side a track remote from the bearing axis for one set of balls and on its other side a track adjacent the bearing axis for the second set of balls, and the second bearing ring having on one side a track adjacent the bearing axis for said first mentioned set of balls and on its other side a track remote from the bearing axis for said second set of balls, the contours of the track-grooves in the said bearing rings, in planes containing the bearing axis, being each at least in part symmetrically shaped about an axis of symmetry, which axes of symmetry for each track respectively intersect on the said bearing axis and form about said bearing axis cones whose apices all open in the same direction along said bearing axis, and a mounting for one of said bearing rings permitting angular displacement of said ring in any plane containing the bearing axis.

6. A rolling bearing comprising two bearing rings each having two conical tracks and two sets of rolling bodies having conical rolling surfaces interposed between said conical tracks and rotating about a common bearing axis, one bearing ring having on one side a track remote from the bearing axis for one set of rolling bodies and on its other side a track adjacent said bearing axis for the second set of rolling bodies, and the second bearing ring having on one side a track adjacent said bearing axis for said first-mentioned set of rolling bodies and on its other side a track remote from the bearing axis for said second set of rolling bodies, the contours of the rolling-tracks in the said bearing rings, in planes containing the bearing axis, being each at least in part symmetrically shaped about an axis of symmetry, which axes of symmetry for each track respectively intersect on the said bearing axis and form about said bearing axis cones whose apices all open in the same direction along said bearing axis, and a mounting for one of said bearing rings, permitting angular displacement of said ring in any plane containing the bearing axis.

MEYER FRENKEL.

REFERENCES CITED

The following references are of record in the file of this patent:

UNITED STATES PATENTS

| Number | Name | Date |
| --- | --- | --- |
| 862,679 | Thames | Aug. 6, 1907 |
| 1,205,539 | Hirth | Nov. 21, 1916 |
| 1,800,564 | O'Connor | Apr. 14, 1931 |